Figure 1:
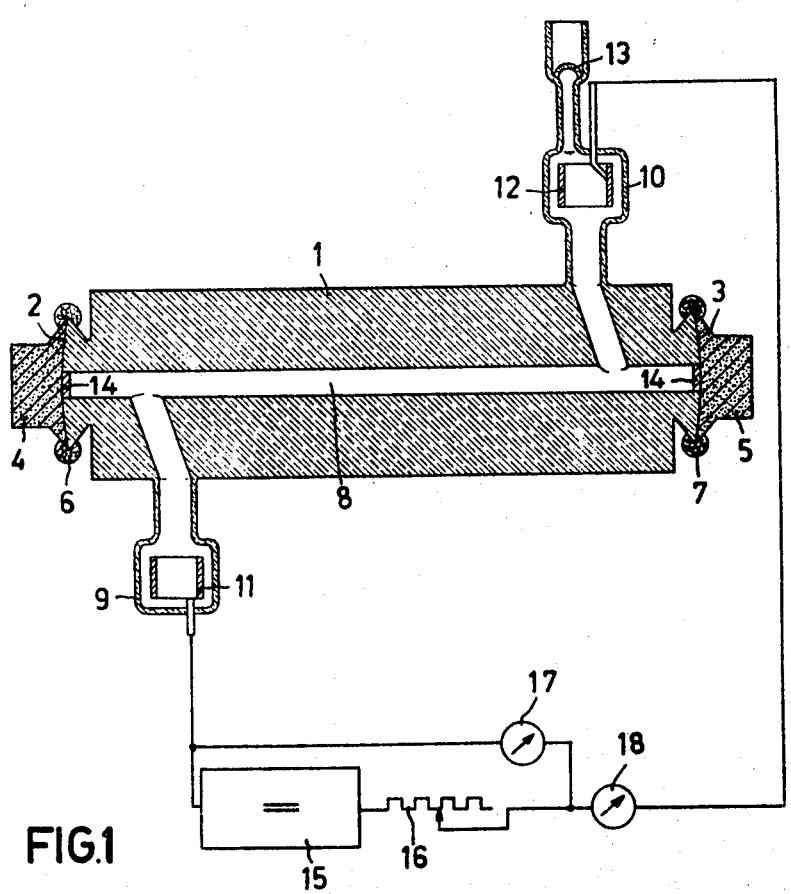

INVENTOR.
JAN HAISMA
SEBASTIAN J. VAN HOPPE 3,387,226
LASER COMPRISING A BLOCK OF INSULATING MATERIAL HAVING A CHANNEL THEREIN FILLED WITH A GAS
Jan Haisma and Sebastiaan Jacobus van Hoppe, Emmasingel, Eindhoven, Netherlands, assignors to North American Philips Company, Inc., New York, N.Y., a corporation of Delaware
Filed July 15, 1963, Ser. No. 295,063
Claims priority, application Netherlands, July 25, 1962, 281,412
3 Claims. (Cl. 331—94.5)

Our invention relates to a device for producing light by stimulated emission of radiation in a gas, otherwise referred to as a gas "laser." In this device stimulated light emission occurs from an excited level having an excess population under the influence of reflected light in a manner such that a coherent light beam is passed by at least one reflecting member which is slightly permeable to light. In addition the invention relates to a gas discharge tube for such a device.

Such a device has been described in an article by Javan, Bennett and Herriott, Phys. Rev. Letters 6, 106–110, 1961. A discharge is produced in a mixture of helium with 10% neon in a tube provided with external electrodes by means of a generator with a frequency of 28 mc./s. coupled to the electrodes. The device bears the name of gas laser, because the active medium is a gas and further by the initials of "light amplification by stimulated emission of radiation." The gas-discharge tube consists of a glass tube of approximately 1 m. length which is closed by plane parallel windows, while inside the tube reflector plates are provided which are covered with layers of dielectric material.

This device is extremely sensitive to mechanical and thermal influences and, as a result of its size, suitable only in a fixed, vibration-free environment.

A principal object of our invention is to provide a device of the aforesaid type which is more compact, rugged and capable of wider application.

Another object of our invention is to provide a gas laser which is relatively insensitive to mechanical and thermal influences.

These and further objects of the invention will appear as the specification progresses.

According to the invention our gas-laser comprises gas-discharge tube which is constituted by a comparatively narrow channel in a solid block of insulating material, the maximum length of which is from 10 to 20 cm. Reflecting members with ground fitting surfaces are provided which engage the ends of this block and are connected therewith in a vacuum-tight manner.

In a preferred embodiment the reflecting members are formed on the optically-ground fitting surfaces, so that at the same time a vacuum-tight closure is obtained. If desired, the edges of the fitting surfaces may be cemented or slightly sealed. Because no separate windows are provided, the length of the laser is as small as possible and reflections are avoided as much as possible.

In order to restrict thermal influences of the electrodes, according to the invention lateral nozzles containing electrodes are sealed to symmetrically provided bores in the solid block. If deformation occurs by the development of heat as a result of the discharge in the lateral bores, the reflecting members maintain their mutually correct positions.

In order to avoid distrubing influences as a result of the channel, the inner wall thereof which is dull as a result of boring may, in addition, be frosted.

Since, in contrast with the known devices, the gas laser according to the invention has only a small length, it is of advantage to choose the pressure considerably higher than in the known devices. Preferably, for a mixture of helium with 5% neon at a length of 10 cm., this pressure should be 3 mm. of mercury column. As reflecting members, any of the following may be used: flat interferometer plates provided with layers of dielectric material, spherical (concave) mirrors provided with layers of dielectric material, 90° prisms with two roof-shaped surfaces, or equivalent members, one of the reflecting members being partially transparent as is required in conventional lasers. As a result of the small cross-sectional dimensions of the channel, the optical properties also must meet very high requirements only across a small surface. Also, as a result of the small dimensions the absorption in 90° prisms with two roof-shaped surfaces is of minor importance.

As the laser according to the invention is very ruggedised, the use of flat interferometer plates is much easier than in the known devices.

Further, as a result of its small length, the gas laser according to the invention is excellently suitable for those investigations in which a magnetic field is used in the longitudinal direction, or if desired in the transverse direction, to influence the excited levels in the gas filling.

In one particular embodiment, two or more parallel channels are provided in the block each of which are provided with a cross bore for the electrodes. As a result of this it is possible to produce more power.

Since a high-frequency discharge in a solid block of insulating material might give rise to many difficulties, inter alia, as a result of high dielectric losses, it is particularly advantageous to use a direct current discharge.

Figure 2:
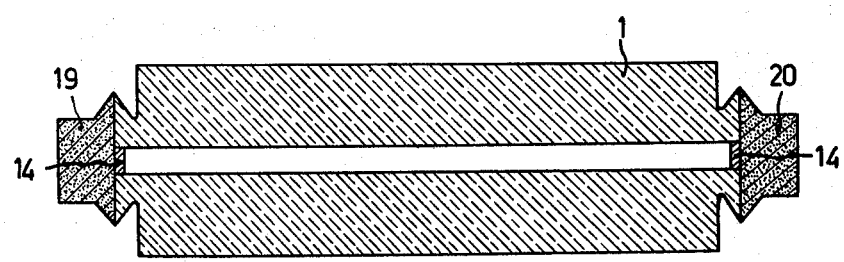

The invention will be described with reference to the accompanying drawing in which FIGURE 1 shows a cross-section of a gas laser according to the invention employing confocal spherical mirrors and FIGURE 2 shows the same arrangement with flat mirrors.

Referring to FIGURE 1, a quartz block 1 having a length of 12 cm. provided with a channel 8 having a diameter of 3 mm. bored in the block is closed at both ends by spherically ground fitting surfaces 2 and 3, respectively of spherical mirrors 4 and 5 having flat outer sides. Although this constitutes a vacuum-tight closure, cement edges 6 and 7 are provided. The inner wall of channel 8 has a dull surface and may, in addition, be provided with a frosting. Lateral nozzles 9 and 10 connecting with channel 8 through lateral bores in block 1 respectively contain molybdenum electrodes 11 and 12 respectively which are connected to a 1000 watt direct voltage source 15 through resistor 16. An ammeter 17 and voltmeter 18 are provided for measuring current and voltage respectively.

An exhaust tube having a breakable seal 13 makes it possible to alter the gas filling in the channel. At opposite ends of the channel 8, spherical mirrors 4 and 5 respectively are covered with a layer 14 of dielectric material, for example, zinc sulphide with magnesium fluoride.

If the laser is filled with helium with 5% of neon under a pressure of 3 mm. mercury column, a laser beam of a few mw. may be intercepted at both ends of the channel with a tube voltage of approximately 600 v., and a current of approximately 15 ma.

Since spherical mirrors are used, it is necessary to concentrate the beam with a lens which, if desired, may be combined with the outside of the mirror.

The laser shown in FIGURE 2 differs from that in FIG. 1 in that the interferometer plates 19 and 20 have flat surfaces, when coated with dielectric reflecting layers 14.

Since thermal and mechanical influences are avoided, it is possible to manipulate this device mechanically or manually without disturbing its operation. This is of considerable advantage in that it permits the laser to be used as a surgical instrument, or as an instrument for melting materials as in cutting through various materials.

While we have described our invention in connection with a specific embodiment and applications thereof, other modifications will be apparent to those skilled in this art without departing from the spirit and scope thereof as defined in the appended claims.

What is claimed is:

1. A device for producing light by stimulated emission of radiation in a gas comprising a solid block of insulating material having at least one narrow channel therewithin extending the length of said block, said block having a longitudinal dimension the maximum length of which is about 10 to 20 cm., light-reflecting members each having ground surfaces fitting with and directly engaging the ends of the block and connected therewith in a vacuum-tight manner thereby closing the ends of said channel, one of said reflecting members being partially transparent, means to introduce a gaseous active medium into said channel, and means to excite the gaseous active medium gas in said channel to stimulate emission therefrom.

2. A device for producing light by stimulated emission of radiation from a gas comprising a block of insulating material having at least one channel therewithin extending the length of said block, said block of insulating material having a longitudinal dimension the maximum length of which is about 10 to 20 cm., reflecting members having ground surfaces fitting with and directly engaging the ends of the block and connected therewith in a vacuum-type manner thereby closing the ends of said channel, one of said reflecting members being partially transparent, transverse channels in said block connecting with said longitudinal channel for supplying a gaseous active medium thereto, nozzles connected to said transverse channels, electrodes in said nozzles, and means for applying electrical energy to said nozzles for exciting the gaseous active medium in said longitudinal channel to stimulate emission of radiation therefrom.

3. A device for producing light by stimulated emission of radiation from a gas comprising a block of insulating material having at least one channel therewithin extending the length of said block, said channel having a length of about 10 cm. and a frosted inner wall, spherical reflecting members having ground surfaces fitting with and directly engaging the ends of said block and connected therewith in a vacuum-tight manner thereby closing the ends of said channels said reflecting members having a dielectric layer on the side facing the channel, one of said reflecting members being partially transparent, means to introduce and maintain in said channel a gas consisting of helium containing 5% of neon at a pressure of about 3 mm. of mercury column, and means to produce a direct-current discharge in the gas in said channel to stimulate the emission of radiation therefrom.

References Cited

UNITED STATES PATENTS 3,149,290  9/1964  Bennett et al. _____ 331—94.5

FOREIGN PATENTS 608,711  3/1962  Belgium.

OTHER REFERENCES

Haisma et al., "A Small, Stable Gas Laser," Philips Technical Review, vol. 24, No. 3 (Feb. 4, 1962), pp. 95–97.

JEWELL H. PEDERSEN, *Primary Examiner.*

W. L. SIKES, *Assistant Examiner.*